US012242247B2

(12) United States Patent
Mohri et al.

(10) Patent No.: US 12,242,247 B2
(45) Date of Patent: Mar. 4, 2025

(54) IDENTIFIER MANAGEMENT METHOD, ROBOT CONTROL DEVICE, AND INTEGRATED CONTROL DEVICE

(71) Applicant: Panasonic Intellectual Property Management Co., Ltd., Osaka (JP)

(72) Inventors: Toshinari Mohri, Osaka (JP); Hisashi Kataoka, Osaka (JP); Takamichi Komatsu, Osaka (JP); Ryutaro Monden, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 365 days.

(21) Appl. No.: 17/716,151

(22) Filed: Apr. 8, 2022

(65) Prior Publication Data
US 2022/0229417 A1    Jul. 21, 2022

Related U.S. Application Data

(63) Continuation of application No. PCT/JP2020/037361, filed on Sep. 30, 2020.

(30) Foreign Application Priority Data

Oct. 11, 2019    (JP) .................................. 2019-188158

(51) Int. Cl.
  *B23K 9/095*    (2006.01)
  *G05B 19/4155*   (2006.01)
  *G05B 19/418*    (2006.01)

(52) U.S. Cl.
  CPC ........ *G05B 19/4155* (2013.01); *B23K 9/0953* (2013.01); *G05B 19/4183* (2013.01); *G05B 2219/45135* (2013.01)

(58) Field of Classification Search
  CPC ............ G05B 19/4155; G05B 19/4183; G05B 2219/45135; B23K 9/0953
  See application file for complete search history.

(56) References Cited

U.S. PATENT DOCUMENTS 6,516,239 B1      2/2003  Madden et al.
2002/0198618 A1 *  12/2002  Madden ................. B62D 65/02
                                                    700/115

(Continued)

FOREIGN PATENT DOCUMENTS

JP    2007-304999    11/2007
JP    2008-059116     3/2008

(Continued)

OTHER PUBLICATIONS

Extended European Search Report issued Nov. 7, 2022 in corresponding European Patent Application No. 20875527.2.

(Continued)

*Primary Examiner* — Michael W Choi
(74) *Attorney, Agent, or Firm* — Wenderoth, Lind & Ponack, L.L.P.

(57) ABSTRACT

An identifier management method is executed by a welding system. The identifier management method includes: acquiring information on identifiers of a plurality of original workpieces; randomly selecting any one of the identifiers of the plurality of original workpieces to be adopted based on completion of execution of a welding process using the plurality of original workpieces by the welding system; and setting the any one of identifiers of the plurality of original workpieces, which has been selected, as an identifier of the welded workpiece generated in the welding process.

9 Claims, 9 Drawing Sheets

(56) References Cited

U.S. PATENT DOCUMENTS

| | | |
|---|---|---|
| 2010/0114355 A1 | 5/2010 | Harashima et al. |
| 2011/0022665 A1 | 1/2011 | Pinto et al. |
| 2014/0263227 A1 | 9/2014 | Daniel et al. |
| 2015/0278721 A1 | 10/2015 | Oku |
| 2017/0066092 A1 | 3/2017 | Yamamoto |
| 2017/0153616 A1 | 6/2017 | Sakakibara et al. |
| 2018/0257225 A1 | 9/2018 | Satou |
| 2018/0335768 A1* | 11/2018 | Sano ............... G05B 19/41865 |

FOREIGN PATENT DOCUMENTS

| | | |
|---|---|---|
| JP | 2010-113425 | 5/2010 |
| JP | 2015-153196 | 8/2015 |
| JP | 2015-171736 | 10/2015 |
| JP | 2017-102548 | 6/2017 |

OTHER PUBLICATIONS

International Search Report issued Dec. 1, 2020 in International (PCT) Application No. PCT/JP2020/037361 with English translation.

Written Opinion of the International Searching Authority issued Dec. 1, 2020 in International (PCT) Application No. PCT/JP2020/037361.

Wang Yankai, "Design and Development of Conveying System for Body In White Flexible Welding Workshop", China Academic Journal Electronic Publishing House, "Chinese Excellent Master's Thesis Full Text Database (Engineering Science and Technology II)", Issue 4, pp. 1-4, Published: Apr. 2019.

* cited by examiner

IDENTIFIER MANAGEMENT METHOD, ROBOT CONTROL DEVICE, AND INTEGRATED CONTROL DEVICE

CROSS-REFERENCE TO RELATED APPLICATIONS

This application is a continuation of PCT International Patent Application No. PCT/JP2020/037361 filed on Sep. 30, 2020, which claims the benefit of priority of Japanese Patent Application No. 2019-188158 filed on Oct. 11, 2019, the entire contents of which are incorporated herein by reference.

FIELD

The present disclosure relates to an identifier management method, a robot control device, and an integrated control device.

BACKGROUND

JP-A-2017-102548 discloses a production management device that manages production performance information on a manufacturing line in which a plurality of manufacturing machines are arranged. The production management device detects which manufacturing machine a workpiece supplied to the manufacturing line is located in, generates an identifier unique to the workpiece when it is detected that the workpiece is located in any manufacturing machine, notifies the manufacturing machine in which the workpiece is located, and receives and records the generated identifier and the production performance information at the time of processing the workpiece corresponding to the identifier from the manufacturing machine. Each time the workpiece is sequentially moved to each of a plurality of manufacturing machines, the production management device records a plurality of identifiers generated for the workpiece and identifiers of products completed by the workpiece in association with each other.

SUMMARY

The present disclosure provides an identifier management method, a robot control device, and an integrated control device, which support easier management of an identifier of a workpiece manufactured in a process such as welding, an identification sign assignment device, and a weldment.

The present disclosure provides an identifier management method to be executed by a welding system, the identifier management method including: acquiring information on identifiers of a plurality of original workpieces; randomly selecting any one of the identifiers of the plurality of original workpieces to be adopted based on completion of execution of a welding process using the plurality of original workpieces by the welding system; and setting the any one of the identifiers of the original workpieces, which has been selected, as an identifier of the welded workpiece generated in the welding process.

The present disclosure provides a robot control device constituting a welding system, the robot control device including: a memory configured to hold information on identifiers of a plurality of original workpieces; a processor configured to control a welding robot to allow execution of a welding process using the plurality of original workpieces; and a communication unit configured to communicate with an integrated control device that performs integrated control of the welding system, wherein the processor is configured to: randomly select any one of the identifiers of the respective original workpieces to be adopted based on completion of the execution of the welding process by the welding robot, and transmit, to the integrated control device via the communication unit, a setting request for setting, as an identifier of a welded workpiece generated in the welding process, the any one of the identifiers of the original workpieces which has been selected.

The present disclosure provides an integrated control device constituting a welding system, the integrated control device including: a memory configured to hold information on identifiers of a plurality of original workpieces; a communication unit configured to communicate with a robot control device configured to control execution of a welding process using the plurality of original workpieces; and a processor configured to randomly select any one of the identifiers of the plurality of original workpieces to be adopted based on detection of completion of the execution of the welding process by the robot control device, wherein the processor is configured to: set, as an identifier of a welded workpiece generated in the welding process, the any one of the identifiers of the original workpieces which has been selected.

According to the present disclosure, it is possible to support easier management of an identifier of a workpiece manufactured in a process such as welding.

DETAILED DESCRIPTION (Introduction to Present Disclosure)

Figure 1:
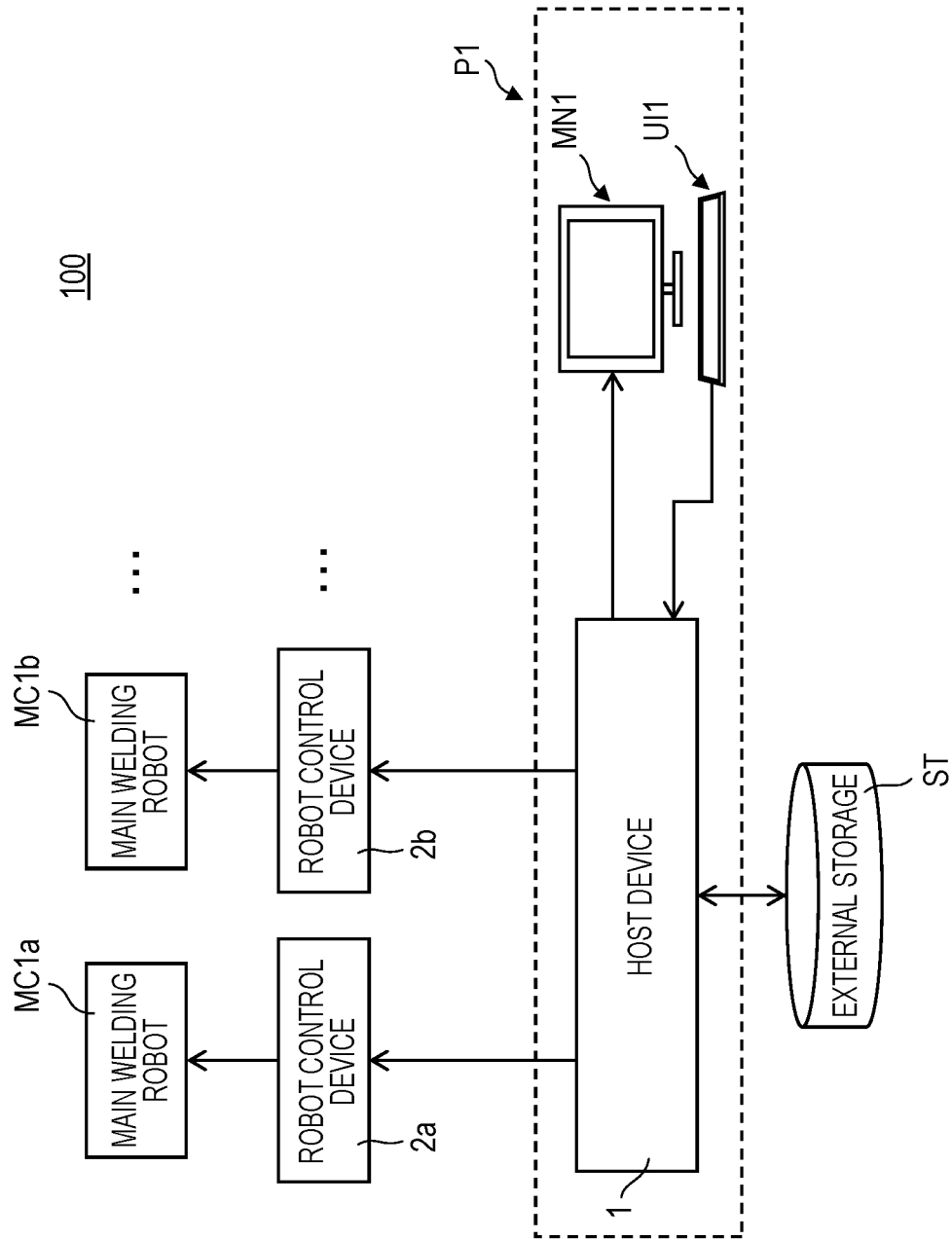
FIG. 1 is a schematic diagram showing a system configuration example of a welding system.

According to JP-A-2017-102548, a production management device can manage traceability data for each workpiece. However, in the configuration of JP-A-2017-102548, different identifiers are newly assigned each time the same workpiece is located in a plurality of different manufacturing machines. In other words, each time one workpiece is sequentially located on another manufacturing machine in a manufacturing line, the one workpiece has a plurality of different identifiers. Therefore, for example, when a plurality of workpieces are joined and another workpiece is manufactured as in a welding process, if a new identifier is assigned to the manufactured workpiece in accordance with JP-A-2017-102548, a relationship between an identifier of the workpiece used in the welding process and an identifier of the manufactured workpiece may be complicated, and thus it may be difficult to use traceability related to the manufactured workpiece. That is, management of the identifier of the workpiece is complicated, and work efficiency of a system administrator is deteriorated.

Therefore, in the following embodiments, examples of an identifier management method, a robot control device, and an integrated control device, which support more efficient and easier management of the identifier of the workpiece manufactured in a process such as welding will be described.

Hereinafter, embodiments specifically disclosing an identifier management method, a robot control device, and an integrated control device according to the present disclosure will be described in detail with reference to the drawings as appropriate. However, an unnecessarily detailed description may be omitted. For example, a detailed description of a well-known matter or a repeated description of substantially the same configuration may be omitted. This is to avoid unnecessary redundancy in the following description and to facilitate understanding of those skilled in the art. It should be noted that the accompanying drawings and the following description are provided to enable those skilled in the art to fully understand the present disclosure, and are not intended to limit the range of the claims.

First Embodiment

The welding system according to the first embodiment acquires information on identifiers of a plurality of original workpieces, and randomly selects any one of identifiers of respective original workpieces to be adopted based on completion of execution of a welding process using the plurality of original workpieces. The welding system sets the any one of the identifiers of the original workpieces, which has been selected, as the identifier of the welded workpiece produced in the welding process. Hereinafter, the workpiece used in the welding process is defined as an "original workpiece", and the workpiece produced in the welding process is defined as a "welded workpiece". The "welded workpiece" may be referred to as a "secondary workpiece" or an "n-th workpiece" (n: an integer of 2 or more).
(Configuration of Welding System)

FIG. 1 is a schematic diagram showing a system configuration example of a welding system 100. The welding system 100 includes a host device 1 connected to each of an external storage ST, an input interface UI1, and a monitor MN1, a plurality of robot control devices (for example, robot control devices 2a, 2b, and so on), and a plurality of main welding robots (for example, main welding robots MC1a, MC1b, and so on). The robot control device 2a is provided corresponding to the main welding robot MC1a, the robot control device 2b is provided corresponding to the main welding robot MC1b, and the same number of robot control devices are similarly provided corresponding to one main welding robot.

The host device 1 serving as an example of an integrated control device integrally controls the execution of the main welding (so-called welding process) executed by the corresponding main welding robots MC1a, MC1b, and so on via each of the plurality of robot control devices 2a, 2b, and so on. For example, the host device 1 reads, from the external storage ST, welding-related information input or set in advance by the user (for example, a welding operator or a system administrator. The same applies hereinafter), generates a welding process execution command including a part of contents of the welding-related information based on the welding-related information, and transmits the generated execution command to the corresponding robot control device (for example, the robot control device 2a). The execution command of the main welding described above is not limited to being generated by the host device 1, and may be generated by, for example, an operation panel (for example, a programmable logic controller (PLC)) of equipment in a factory or the like in which the main welding is performed, or an operation panel (for example, TP) of the robot control devices 2a, 2b, and so on.

Here, the welding-related information is information indicating the content of the welding process executed for each main welding robot, and is created in advance for each welding process and registered in the external storage ST. The welding-related information includes, for example, the number of original workpieces required for the welding process, an identifier (hereinafter, abbreviated as "ID") of the original workpiece used in the welding process, workpiece information including a name and a welding portion of the original workpiece, an execution scheduled date on which the welding process is scheduled to be executed, the number of welded workpieces, and various welding conditions at the time of the welding process. The welding-related information is not limited to data of items described above. The robot control device (for example, the robot control device 2a) causes the main welding robot (for example, the main welding robot MC1a) to perform the welding process using the plurality of original workpieces designated by the execution command based on the execution command transmitted from the host device 1. In the present specification, the type of the welding process is not limited, but in order to make the description easy to understand, a process of joining each of the plurality of original workpieces will be described as an example (see FIGS. 3 and 4).

The host device 1 is connected to the monitor MN1, the input interface UI1, and the external storage ST so as to be able to input and output data, and is further connected to each of the plurality of robot control devices 2a, 2b, and so on so as to be able to communicate data. The host device 1 may include a terminal device P1 integrally including the monitor MN1 and the input interface UI1, and may further integrally include the external storage ST. In this case, the terminal device P1 is a personal computer (PC) used by a user prior to execution of a welding process (for example, main welding). The terminal device P1 is not limited to the PC described above, and may be a computer device having a communication function, such as a smartphone or a tablet terminal.

The host device 1 acquires the above-described welding-related information from the external storage ST, generates the welding process execution command using the plurality of original workpieces based on the welding-related information, and transmits the execution command to the corresponding robot control devices 2a, 2b, and so on. When the host device 1 receives the ID of a welded workpiece (for example, a secondary workpiece) from the corresponding robot control devices 2a, 2b, and so on after the completion of the welding process by each of the main welding robots MC1a, MC1b, and so on, the host device 1 sets the ID as the identifier (ID) of the welded workpiece, generates welding process logical data (see FIGS. 3 and 4) corresponding to the welded workpiece, and stores the welding process logical data in association with the ID of the welded workpiece in the external storage ST. Accordingly, the host device 1 can appropriately and easily manage the IDs of the welded workpieces produced by the welding process by various main welding robots. Details of an operation of the host device 1 will be described later with reference to the drawings. The host device 1 may display the welding process logical data including the ID of the welded workpiece on the monitor MN1.

The monitor MN1 may be configured with a display device such as a liquid crystal display (LED) or an organic electroluminescence (EL). The monitor MN1 may display, for example, a screen indicating the welding process logical data including the ID of the welded workpiece, which is output from the host device 1. Instead of the monitor MN1 or together with the monitor MN1, a speaker (not shown) may be connected to the host device 1, and the host device 1 may output the contents of the welding process logical data by voice via the speaker.

The input interface UI1 is a user interface that detects an input operation of the user and outputs the input operation to the host device 1, and may be configured using, for example, a mouse, a keyboard, or a touch panel. The input interface UI1 receives, for example, an input operation when the user creates the welding-related information, or an input operation when a welding process execution command is transmitted to the robot control device 2a.

The external storage ST is configured using, for example, a hard disk drive (HDD) or a solid state drive (SSD). The external storage ST stores, for example, data of welding-related information created for each welding process, and welding process logical data (see FIGS. 3 and 4) including the ID of the welded workpiece produced by the welding process.

The robot control devices 2a, 2b, and so on are connected so as to be able to communicate data with the host device 1, and are connected so as to be able to communicate data with each of the main welding robots MC1a, MC1b, and so on. When the robot control devices 2a, 2b, and so on receive the welding process execution command sent from the host device 1, the robot control devices 2a, 2b, and so on control the corresponding main welding robots MC1a, MC1b, and so on based on the execution command to execute the welding process. When detecting the completion of the welding process, the robot control devices 2a, 2b, and so on generate a welding completion notification indicating the completion of the welding process and transmit the welding completion notification to the host device 1. Accordingly, the host device 1 can appropriately detect the completion of the welding process based on each of the robot control devices 2a, 2b, and so on. The method of detecting the completion of the welding process by the robot control devices 2a, 2b, and so on may be a method of determining the completion of the welding process based on a signal indicating the completion of the welding process from a sensor (not shown) included in, for example, a wire feeding device 300, or may be a known method, and a content of the method of detecting the completion of the welding process is not limited.

The main welding robots MC1a, MC1b, and so on as an example of the welding robot are connected to the robot control devices 2a, 2b, and so on so as to be able to communicate data with the robot control devices 2a, 2b, and so on. The main welding robots MC1a, MC1b, and so on execute the welding process instructed by the host device 1 under the control of the corresponding robot control devices 2a, 2b, and so on.

Figure 2:
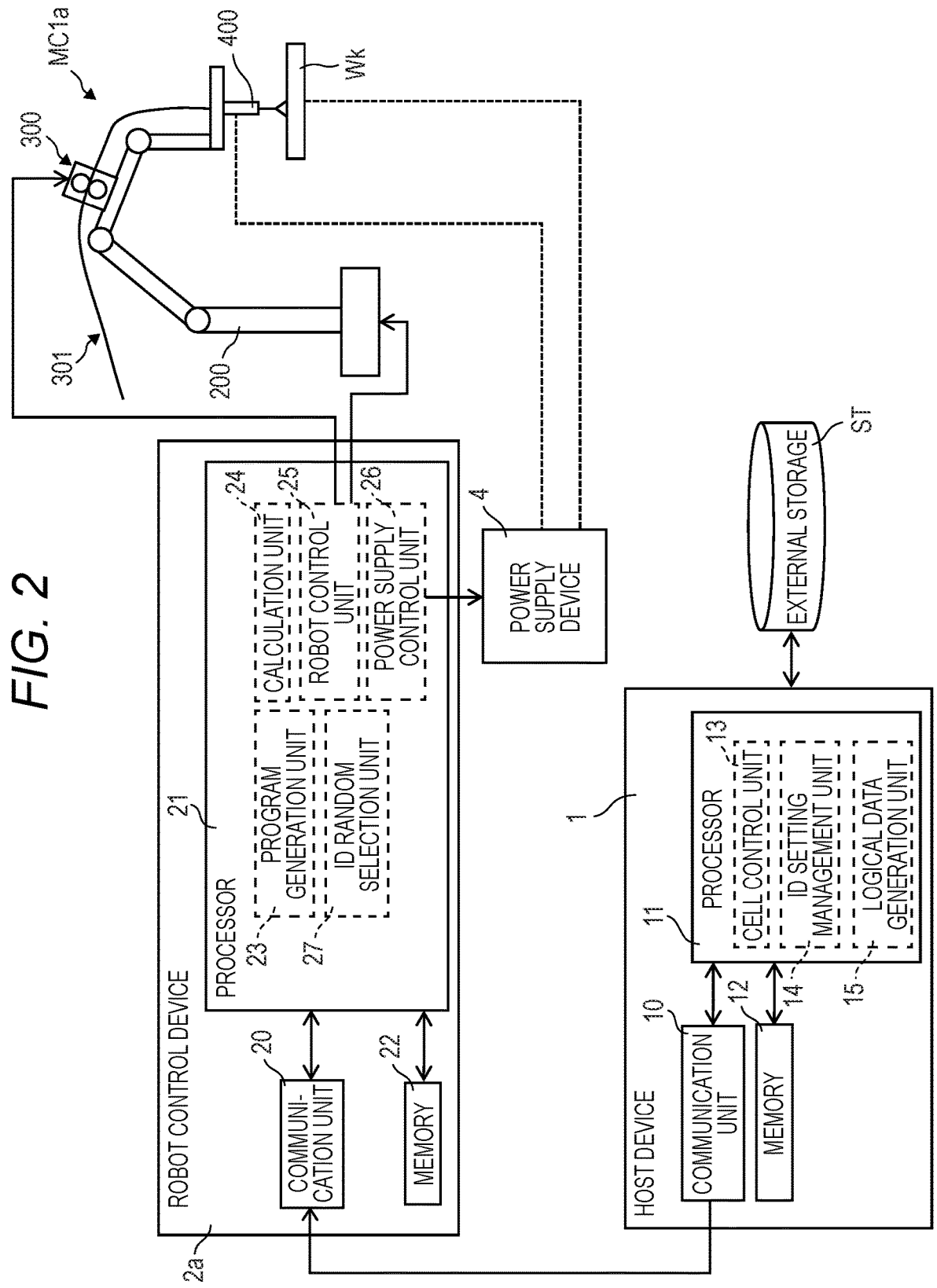
FIG. 2 is a diagram showing an internal configuration example of a robot control device and a host device according to the first embodiment.

FIG. 2 is a diagram showing an internal configuration example of the robot control device 2a and the host device 1 according to the first embodiment. In order to make the description easy to understand, the monitor MN1 and the input interface UI1 are not shown in FIG. 2, the main welding robot MC1a among the main welding robots MC1a, MC1b, and so on is exemplified, and further, the robot control device 2a among the robot control devices 2a, 2b, and so on is exemplified.

The main welding robot MC1a executes the welding process instructed from the host device 1 under the control of the robot control device 2a. The main welding robot MC1a performs, for example, arc welding in the welding process. However, the main welding robot MC1a may perform welding (for example, laser welding or gas welding) other than the arc welding. In this case, although not shown, a laser head may be connected to a laser oscillator via an optical fiber instead of a welding torch 400. The main welding robot MC1a includes at least a manipulator 200, the wire feeding device 300, a welding wire 301, and the welding torch 400.

The manipulator 200 includes an articulated arm, and moves each arm based on a control signal from a robot control unit 25 (see the following description) of the robot control device 2a. Accordingly, the manipulator 200 can change a positional relationship between a workpiece Wk and the welding torch 400 (for example, an angle of the welding torch 400 with respect to the workpiece Wk) by the movement of the arm.

The wire feeding device 300 controls a feeding speed of the welding wire 301 based on a control signal (see the following description) from the robot control device 2a. The wire feeding device 300 may include a sensor capable of detecting a remaining amount of the welding wire 301.

The welding wire 301 is held by the welding torch 400. When electric power is supplied from a power supply device 4 to the welding torch 400, an arc is generated between a tip end of the welding wire 301 and the workpiece Wk, and the arc welding is performed. The illustration and description of a configuration and the like for supplying shielding gas to the welding torch 400 are omitted for the convenience of description.

The host device 1 generates the welding process execution command using each of the plurality of original workpieces by using the welding-related information input or set in advance by the user, and transmits the execution command to the robot control device 2a. The host device 1 includes at least a communication unit 10, a processor 11, and a memory 12.

The communication unit 10 is connected to the robot control device 2 and the external storage ST so that data can be communicated among the communication unit 10, the robot control device 2a, and the external storage ST. The communication unit 10 transmits a welding process execution command (see the above description) generated by the processor 11 to the robot control device 2a. The communication unit 10 receives the ID of the welded workpiece transmitted from the robot control device 2a and outputs the ID to the processor 11. The welding process execution command may include, for example, a control signal for controlling each of the manipulator 200, the wire feeding device 300, and the power supply device 4 included in the main welding robot MC1a.

The processor 11 is configured using, for example, a central processing unit (CPU) or a field programmable gate array (FPGA), and performs various processing and control in cooperation with the memory 12. Specifically, the processor 11 functionally implements a cell control unit 13, an ID setting management unit 14, and a logical data generation unit 15, and by referring to a program held in the memory 12 and executing the program.

The memory 12 includes, for example, a random access memory (RAM) as a workpiece memory used when processing of the processor 11 is executed, and a read only memory (ROM) for storing a program defining processing of the processor 11. The RAM temporarily stores data generated or acquired by the processor 11. A program that defines processing of the processor 11 is written into the ROM. The memory 12 stores the data of the welding-related information read from the external storage ST, data of secondary workpiece information (see the following description) including the ID of the welded workpiece (secondary workpiece) transmitted from the robot control device 2a, and the welding process logical data (see FIGS. 3 and 4) of the secondary workpiece generated by the processor 11.

The cell control unit 13 generates the execution command for executing the welding process using the plurality of original workpieces defined (in other words, set) in the welding-related information based on the welding-related information stored in the external storage ST. The cell control unit 13 may generate a different welding process execution command for each welding process executed by each of the main welding robots MC1a, MC1b, and so on. The welding process execution command generated by the cell control unit 13 is transmitted to the corresponding robot control devices 2a, 2b, and so on via the communication unit 10.

The ID setting management unit 14 sets the ID of the welded workpiece (secondary workpiece) transmitted from the robot control device (for example, the robot control device 2a) as the ID of the welded workpiece (secondary workpiece) produced by the welding process using the plurality of original workpieces, and stores the ID in the memory 12. The ID setting management unit 14 may store the ID of the welded workpiece (secondary workpiece) and the welding process logical data (see the following description) in association with each other in the external storage ST.

Figure 3:
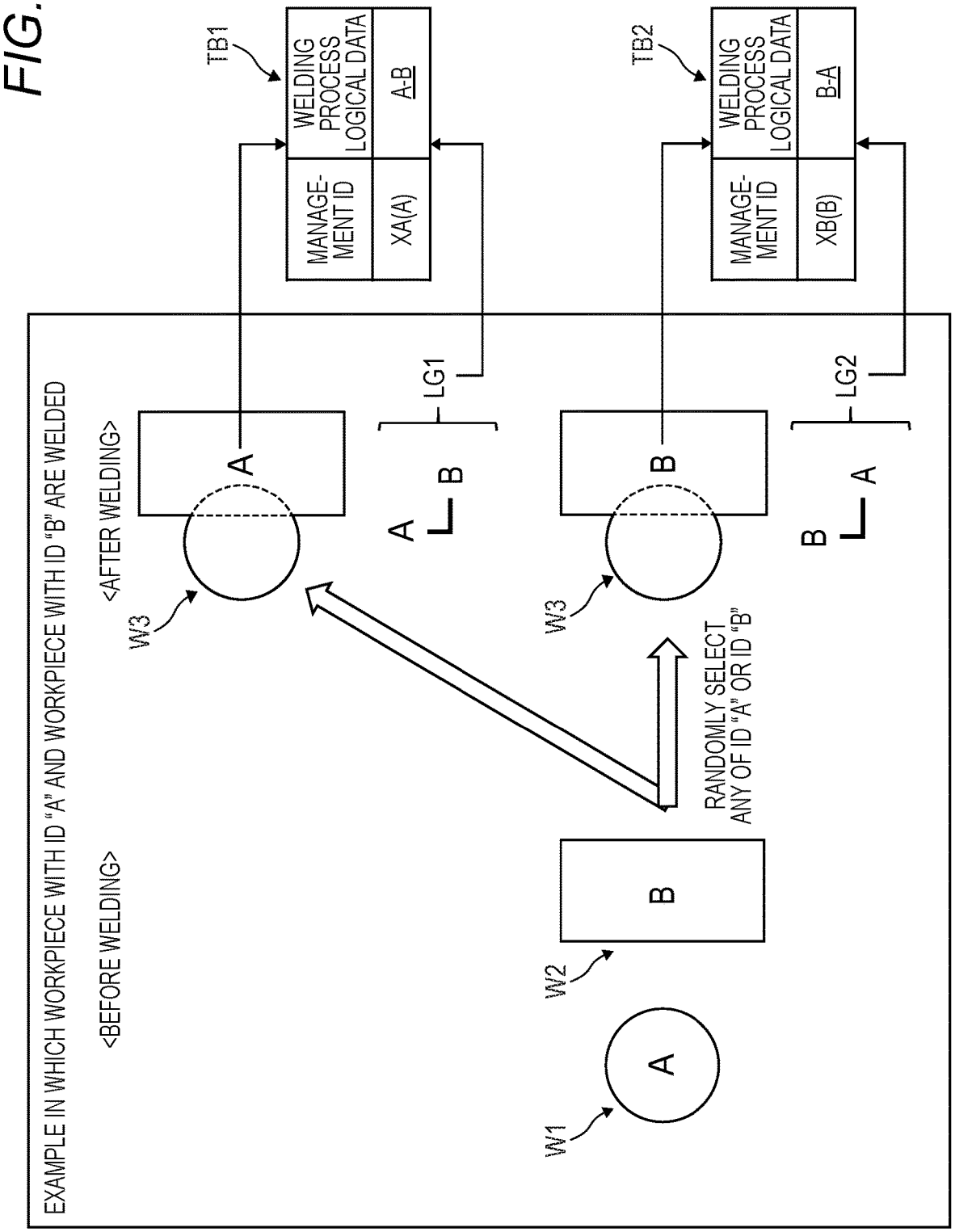
FIG. 3 is an explanatory diagram showing an example of an operation outline example at the time of welding using a workpiece with an ID "A" and a workpiece with an ID "B".
Figure 4:
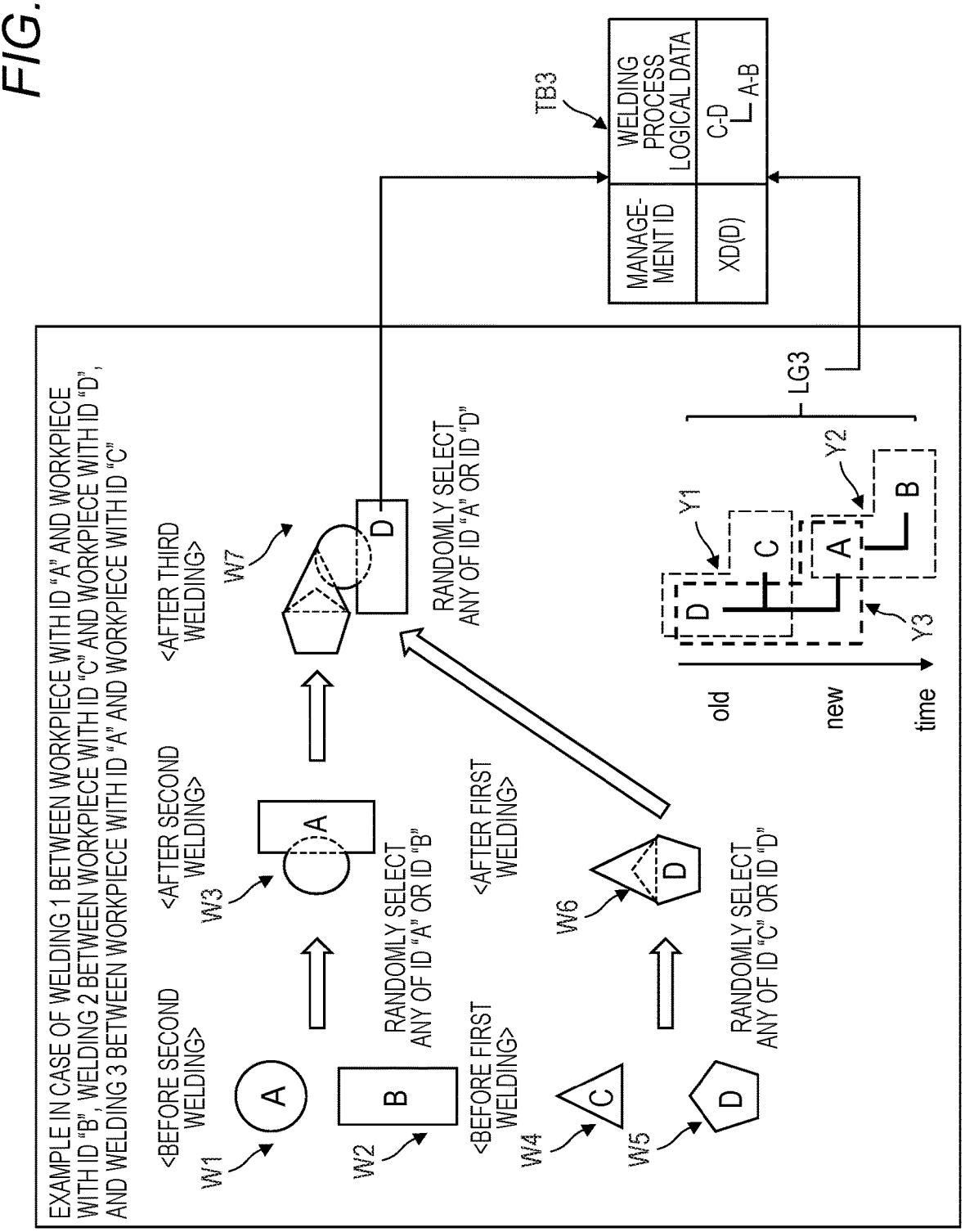
FIG. 4 is an explanatory diagram showing an example of the operation outline at the time of welding using a workpiece with an ID "A", a workpiece with an ID "B", a workpiece with an ID "C", and a workpiece with an ID "D".

The logical data generation unit 15 uses the secondary workpiece information including the ID of the welded workpiece (secondary workpiece) transmitted from the robot control device (for example, the robot control device 2a) to generate the welding process logical data indicating a relationship between the ID of the secondary workpiece and the ID of each of the plurality of original workpieces used in the welding process (for example, a strength relationship of the IDs) (see FIGS. 3 and 4). Details of the strength of the ID and the welding process logical data will be described later with reference to FIGS. 3 and 4. The logical data generation unit 15 may store the ID of the welded workpiece (secondary workpiece) and the welding process logical data in association with each other in the external storage ST.

The robot control device 2a controls the processing of the corresponding main welding robot MC1a (specifically, the manipulator 200, the wire feeding device 300, and the power supply device 4) based on the welding process execution command sent from the host device 1. The robot control device 2a includes at least a communication unit 20, a processor 21, and a memory 22.

The communication unit 20 is connected to enable data communication between the host device 1 and the main welding robot MC1a. Although illustration is simplified in FIG. 2, data is transmitted and received between the robot control unit 25 and the manipulator 200, between the robot control unit 25 and the wire feeding device 300, and between a power supply control unit 26 and the power supply device 4 via the communication unit 20. The communication unit 20 receives the welding process execution command transmitted from the host device 1. The communication unit 20 transmits the secondary workpiece information including the ID of the welded workpiece (the secondary workpiece) produced by the welding process to the host device 1.

Here, the secondary workpiece information includes, in addition to the ID of the welded workpiece (the secondary workpiece), at least workpiece information (for example, the ID and name of the original workpiece, the welding portion of the original workpiece) including the IDs of the plurality of original workpieces used in the welding process, and welding conditions at the time of execution of the welding process. The welding conditions include, for example, a material and a thickness of the original workpiece, a material and a wire diameter of the welding wire 301, a type of the shielding gas, a flow rate of the shielding gas, a set average value of a welding current, a set average value of a welding voltage, a feeding speed and a feeding amount of the welding wire 301, the number of times of welding, and a welding time. In addition to these, for example, information indicating a type of welding process (for example, TIG welding, MAG welding, or pulse welding), and a moving speed and a moving time of the manipulator 200 may be included.

The processor 21 is configured with, for example, a CPU or an FPGA, and executes various processing and controls in cooperation with the memory 22. Specifically, the processor 21 functionally implements a program generation unit 23, a calculation unit 24, the robot control unit 25, the power supply control unit 26, and an ID random selection unit 27 by referring to a program held in the memory 22 and executing the program.

The memory 22 includes, for example, a RAM as a workpiece memory used when the processing of the processor 21 is executed, and a ROM that stores a program defining the processing of the processor 21. The RAM temporarily stores data generated or acquired by the processor 21. The program that defines processing of the processor 21 is written in the ROM. The memory 22 stores data of the welding process execution command transmitted from the host device 1, data of secondary workpiece information including the ID of the welded workpiece (the secondary workpiece) generated by the welding process, and data of welding process logical data (see FIGS. 3 and 4) of the secondary workpiece generated by the processor 21. The memory 22 stores a welding process program executed by the main welding robots MC1a, MC1b, and so on. The welding process program is a program that defines a specific procedure (process) of the welding process of joining the plurality of original workpieces using the welding conditions in the welding process. The program may be created in the robot control device 2a, or may be created by the host device 1, transmitted in advance, and stored in the robot control device 2a.

The program generation unit 23 generates a welding process program to be executed by the main welding robot (for example, the main welding robot MC1a) using the workpiece information (for example, the ID, the name, and the welding portion of the original workpiece) of each of the plurality of original workpieces included in the execution command based on the welding process execution command transmitted from the host device 1 via the communication unit 20. The program may include various parameters such as the welding current, the welding voltage, an offset amount, a welding speed, and a posture of the welding torch 400 for controlling the power supply device 4, the manipulator 200, the wire feeding device 300, the welding torch 400, and the like during the execution of the welding process. The generated program may be stored in the processor 21 or may be stored in the RAM in the memory 22.

The calculation unit 24 performs various calculations. For example, the calculation unit 24 performs calculation or the like for controlling the main welding robot MC1a (specifically, each of the manipulator 200, the wire feeding device 300, and the power supply device 4) controlled by the robot control unit 25 based on a welding process program generated by the program generation unit 23.

The robot control unit 25 drives the main welding robot MC1a (specifically, each of the manipulator 200, the wire feeding device 300, and the power supply device 4) based on the welding process program generated by the program generation unit 23.

The power supply control unit 26 drives the power supply device 4 based on the welding process program generated by the program generation unit 23 and a calculation result of the calculation unit 24.

After the welding process using the plurality of original workpieces is completed, the ID random selection unit 27 randomly selects and determines which ID among the IDs of the plurality of original workpieces is to be adopted as the ID of the welded workpiece (secondary workpiece). In other words, when the IDs of the plurality of original workpieces are "A" and "B" (see FIG. 3), the ID random selection unit 27 randomly selects "A" or "B" as the ID of the welded workpiece (for example, the secondary workpiece). "Random" means that probability that the ID "A" is selected and probability that the ID "B" is selected at the time of selection may be equal (for example, 50% each) or may not be equal. A fact that the probabilities are not equal indicates that, for example, one of the IDs may be selected more unevenly or preferentially than other IDs. Here, ID will be described.

In the present specification, the ID is constituted by, for example, a combination of a plurality of types of character codes. The types are, for example, alphabets and numbers, and are not limited thereto. An example of the ID of the original workpiece is "ABC001XYZ999". Here, in order to make the description easy to understand, the ID is shown as a 12-digit character code formed of "three digits of alphabets", "three digits of numerals", "three digits of alphabets", and "three digits of numerals", whereas the ID is not limited to the configuration examples. Among the 12-digit character codes, for example, the upper three digits of alphabets may indicate codes of a company or a customer (for example, a supplier or a shipping destination), and other "three digits of numerals", "three digits of alphabets", and "three digits of numerals" may indicate serial numbers.

FIG. 3 is an explanatory diagram showing an example of an operation outline at the time of welding using a workpiece with an ID "A" and a workpiece with an ID "B". In the example of FIG. 3, a process in which a welded workpiece (that is, a secondary workpiece W3) is manufactured by joining a circular original workpiece W1 having the ID "A" and a square original workpiece W2 having the ID "B" in one welding process is shown. As described above, the IDs "A" and "B" are, for example, 12-digit alphabets and numerals, but are collectively represented by one alphabetic character in order to make the description of FIG. 3 easy to understand.

In FIG. 3, the ID random selection unit 27 randomly (see the above description) adopts and selects one of the ID "A" and the ID "B" as the ID of the welded workpiece (that is, the secondary workpiece W3). However, even when the ID of the welded workpiece (that is, the secondary workpiece W3) is randomly selected, when the ID "A" of the original workpiece W1 and the ID "A" of the welded workpiece (that is, the secondary workpiece W3) are the same, it may be complicated to manage whether the ID "A" is the ID of the original workpiece W1 or the secondary workpiece W3. Therefore, in the welding system 100 according to the first embodiment, for example, in the welding process using the original workpiece W1 with the ID "A" and the original workpiece W2 with the ID "B", the host device 1 generates welding process logical data LG1 that logically indicates the mutual relationship among the ID "A" of the original workpiece W1, the ID "B" of the original workpiece W2, and the ID "A" of the secondary workpiece W3, or welding process logical data LG2 that logically indicates the mutual relationship among the ID "A" of the original workpiece W1, the ID "B" of the original workpiece W2, and the ID "B" of the secondary workpiece W3. Further, the host device 1 generates a record TB1 in which the ID "A" of the secondary workpiece W3, a management ID (for example, "XA") which is set and used when the ID "A" is actually managed by the user business operator (see the following description), and the welding process logical data LG1 are associated with each other, or a record TB2 in which the ID "B" of the secondary workpiece W3, a management ID (for example, "XB") which is set and used when the ID "B" is actually managed by the user business operator (see the following description), and the welding process logical data LG2 are associated with each other, and stores the records TB1 and TB2 in the external storage ST (see FIG. 3). The host device 1 may display, on the monitor MN1, a display screen indicating the relationship between the ID "A" of the secondary workpiece W3 and the welding process logical data LG1, or a display screen indicating the relationship between the ID "B" of the secondary workpiece W3 and the welding process logical data LG2. Accordingly, the user can intuitively grasp details of the welding process that reaches the manufacture of the secondary workpiece W3.

The welding process logical data LG1 is data having a logical structure in which the ID "A" is located at a higher level and the ID "B" is located at a lower level than the ID "A". That is, the welding process logical data LG1 indicates, as viewed from the ID "A" of the secondary workpiece W3, which ID the original workpiece having is used and the secondary workpiece W3 is manufactured by the welding process, and also indicates a list of IDs of the plurality of original workpieces used in the welding process and a temporal order in which the welding processes are executed when the plurality of welding processes exist. Accordingly, even after the welding process is completed, the user can comprehensively grasp the data on the original workpieces used for manufacturing the secondary workpiece W3 without losing the information on the original workpiece W2.

The welding process logical data LG2 is data having a logical structure in which the ID "B" is located at a higher level and the ID "A" is located at a lower level than the ID "B". That is, the welding process logical data LG2 indicates, as viewed from the ID "A" of the secondary workpiece W3, which ID the original workpiece having is used and the secondary workpiece W3 is manufactured by the welding process, and also indicates a list of IDs of the plurality of original workpieces used in the welding process and a temporal order in which the welding processes are executed when the plurality of welding processes exist. Accordingly, even after the welding process is completed, the user can comprehensively grasp the data on the original workpieces used for manufacturing the secondary workpiece W3 without losing the information on the original workpiece W1.

Although not shown in FIG. 3, when three original workpieces of the original workpiece of the ID "A", the original workpiece of the ID "B", and the original workpiece of the ID "C" are joined or the like and the ID "A" is the strongest, the host device 1 may generate data having a logical structure in which, for example, the ID "A" is located at a highest position and the ID "B" and the ID "C" are located lower than the ID "A" as the welding process logical data.

FIG. 4 is an explanatory diagram showing an example of an operation outline at the time of welding using the workpiece with the ID "A", the workpiece with the ID "B", the workpiece with the ID "C", and the workpiece with the ID "D". The example of FIG. 4 illustrates a process in which a triangular original workpiece W4 having an ID "C" and a pentagonal original workpiece W5 having an ID "D" are joined together in a first welding process to manufacture a welded workpiece (that is, a secondary workpiece W6), a circular original workpiece W1 having an ID "A" and a square original workpiece W2 having an ID "B" are joined together in a second welding process to manufacture a welded workpiece (that is, a secondary workpiece W3), and a secondary workpiece W3 having an ID "A" and a secondary workpiece W6 having an ID "D" are joined together in a third welding process to manufacture a welded workpiece (that is, a tertiary workpiece W7). Similarly, the IDs "A", "B", "C", and "D" are formed of, for example, 12-digit alphabets and numerals, but are collectively represented by one alphabetic character in order to make the description of FIG. 4 easy to understand.

In FIG. 4, the ID random selection unit 27 selects one of the ID "C" and the ID "D" randomly (see the above description) as the ID of the welded workpiece (that is, the secondary workpiece W6) which is the product of the first welding process. For example, the ID "D" is selected. Similarly, the ID random selection unit 27 randomly selects one of the ID "A" and the ID "B" (see the above description) as the ID of the welded workpiece (that is, the secondary workpiece W3) which is the product of the second welding process. For example, the ID "A" is selected. Further, the ID random selection unit 27 randomly selects one of the ID "A" and the ID "D" (see the above description) as the ID of the welded workpiece (that is, the tertiary workpiece W7) which is a product of the third welding process. For example, the ID "D" is selected. However, even if the ID of the welded workpiece (that is, the tertiary workpiece W7) is randomly selected, if the ID "D" of the original workpiece W5, the ID "D" of the welded workpiece (that is, the secondary workpiece W6), and the ID "D" of the tertiary workpiece W7 are all the same, it may be complicated to manage which ID "D" is the original workpiece W4, the secondary workpiece W6, or the tertiary workpiece W7. Therefore, in the welding system 100 according to the first embodiment, for example, in the first welding process to the third welding process, the host device 1 generates welding process logical data LG3 logically indicating the mutual relationship between the finally selected ID "D" and other IDs "A", "B", and "C". Further, the host device 1 generates a record TB3 in which the ID "D" of the tertiary workpiece W7, a management ID (for example, "XD") that is set and used when the ID "D" is actually managed by the user business operator (see the following description), and the welding process logical data LG3 are associated with each other, and stores the record TB3 in the external storage ST (see FIG. 4). The host device 1 may display a display screen indicating the relationship between the ID "D" of the tertiary workpiece W7 and the welding process logical data LG3 on the monitor MN1. Accordingly, the user can intuitively grasp details of the welding process that reaches the manufacture of the tertiary workpiece W7.

The welding process logical data LG3 indicates, when viewed from the ID "D" of the tertiary workpiece W7, which ID the original workpiece having which ID is used in which the welding process the tertiary workpiece W7 is used and manufactured, and also indicates a relationship of the IDs of the plurality of original workpieces used in each welding processes, and a temporal order in which each process is executed. For example, the welding process logical data LG3 indicates that the tertiary workpiece W7 having the ID "D" is manufactured through three welding processes (welding processes Y1, Y2, and Y3). In the welding process Y1, the original workpiece W5 having the ID "C" and the original workpiece W4 having the ID "C" are welded, and the ID "D" is randomly selected as the ID of the secondary workpiece W3. In the welding process Y2, the original workpiece W1 having the ID "A" and the original workpiece W2 having the ID "B" are welded, and the ID "A" is randomly selected as the ID of the secondary workpiece W3. In the welding process Y3, the secondary workpiece W3 having the ID "A" and the secondary workpiece W6 having the ID "D" are welded, and the ID "D" is randomly selected as the ID of the tertiary workpiece W7. In the welding process logical data LG3, when viewed from the ID "D" of the tertiary workpiece W7, a position closer to the ID "D" indicates that a time at which the original workpiece W5 or the secondary workpiece W6 having the ID "D" is welded is older, and a position farther from the ID "D" indicates that the time at which the original workpiece W5 or the secondary workpiece W6 having the ID "D" is welded is newer. Accordingly, even after all of the plurality of welding processes are completed, the user can comprehensively grasp the data related to each original workpiece used for manufacturing the tertiary workpiece W7 without losing the information on the original workpiece or the secondary workpiece of the ID unselected as a result of random selection in each welding process.

Figure 5:
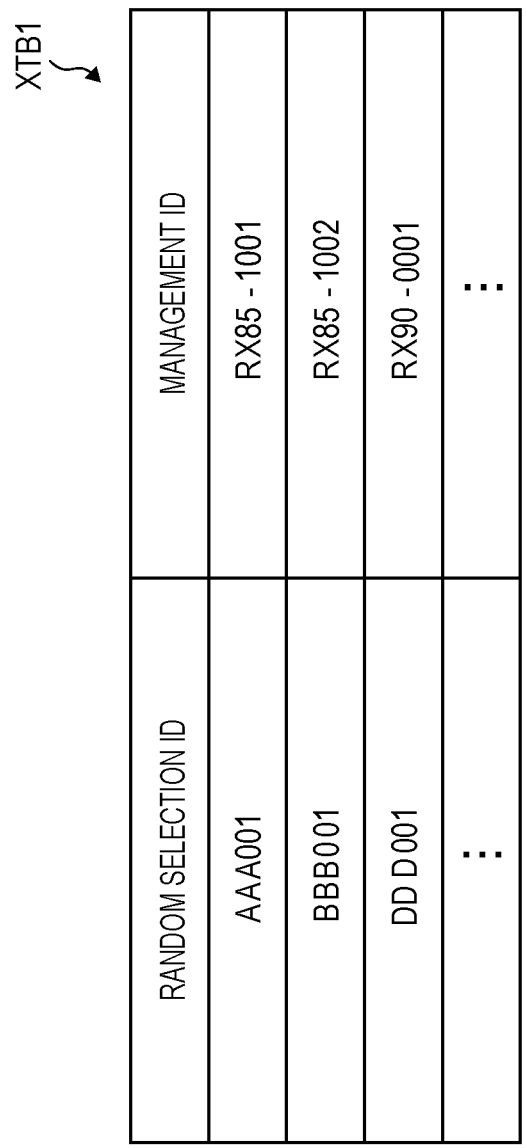
FIG. 5 is a diagram showing an example of a correspondence table between a random selection ID and a management ID.

FIG. 5 is a diagram showing an example of a correspondence table between the random selection ID and the management ID. The correspondence table XTB1 includes one or more records TB1, TB2, and TB3 shown in FIG. 3 or 4. In order for the business operator (hereinafter, referred to as the "user business operator") executing the welding process to actually implement efficient management of the ID of the welded workpiece manufactured by the welding process, the randomly selected ID (random selection ID) may be replaced with a management ID in a format suitable for management by the user business operator. Therefore, in order for the user business operator to efficiently manage the IDs of the welded workpieces, for example, the host device 1 sets a management ID in place of the random selection ID by the operation of the user, generates the correspondence table XTB1 that defines the relationship between the random selection ID and the corresponding management ID, and stores the correspondence table XTB1 in the external storage ST. The correspondence table XTB1 may be stored in the memory 12 of the host device 1.

For example, the correspondence table XTB1 of FIG. 5 defines management IDs "RX85-1001", "RX85-1002", and "RX90-0001" unique to a company or a customer (for example, a shipping destination) so as to correspond to random selection IDs "AAA001", "BBB001", "DDD001", and so on. "RX85-1001", "RX85-1002", "RX90-0001", and so on are the same customer since "RX" before the hyphen in the ID is common, and since the branch numbers (numbers after the hyphen in the ID) of "RX85" and "RX90" are different, the workpieces are individually different welded workpieces (products by the welding process).

Figure 6:
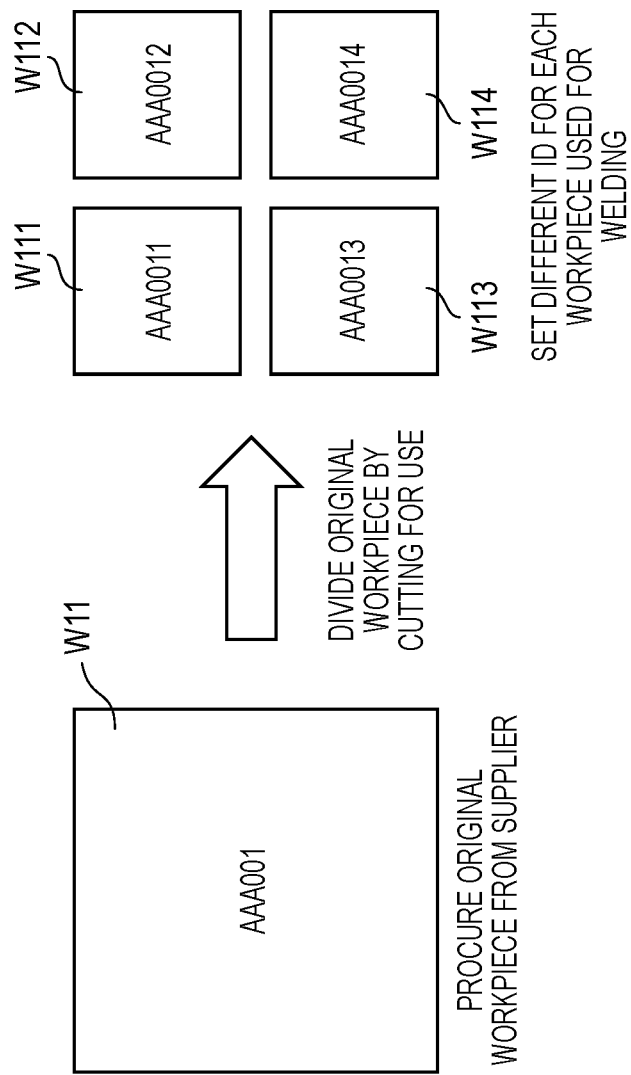
FIG. 6 is a diagram showing an example in which different IDs are assigned to a plurality of original workpieces generated by division.

FIG. 6 is a diagram showing an example in which different IDs are assigned to a plurality of original workpieces W111, W112, W113, and W114 generated by division. The user business operator may supply (procure) the original workpiece W11 from a supplier (in other words, an outsource destination that is a purchase destination of the original workpiece (part) used in the welding process). It is assumed that the management ID of the user business operator of the original workpiece W11 is "AAA001". In the welding process, the original workpiece W11 may not be used as it is, but may be divided into, for example, four steel materials. In such a case, the welding system 100 may set different IDs in the host device 1 so as to have relevance to the ID of a parent original workpiece W11 with respect to each of the four original workpieces W111, W112, W113, and W114, which are steel materials, by an input operation performed by the user via an input interface U1.

Specifically, the host device 1 sets the ID of the original workpiece W111 to "AAA0011", the ID of the original workpiece W112 to "AAA0012", the ID of the original workpiece W113 to "AAA0013", and the ID of the original workpiece W114 to "AAA0014". Accordingly, since the welding system 100 can set the ID in the state of the original workpiece suitable for a size, a shape, and the like actually used in the welding process, the identifier of the welded workpiece and the welding process logical data can be correctly generated.

(Operation of Welding System)

Figure 7:
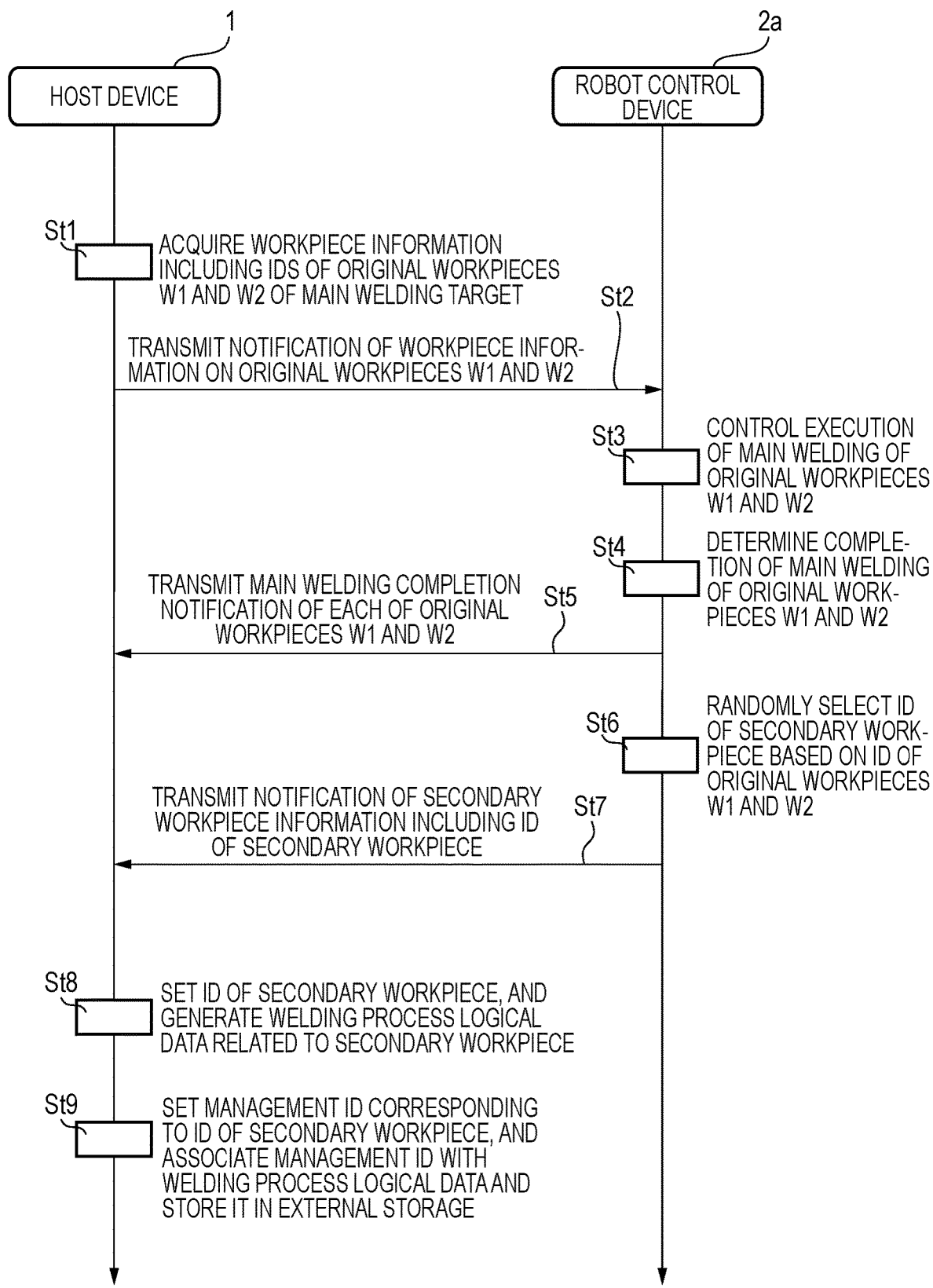
FIG. 7 is a sequence diagram showing an example of an operation procedure of ID management in the welding system according to the first embodiment.
Figure 8:
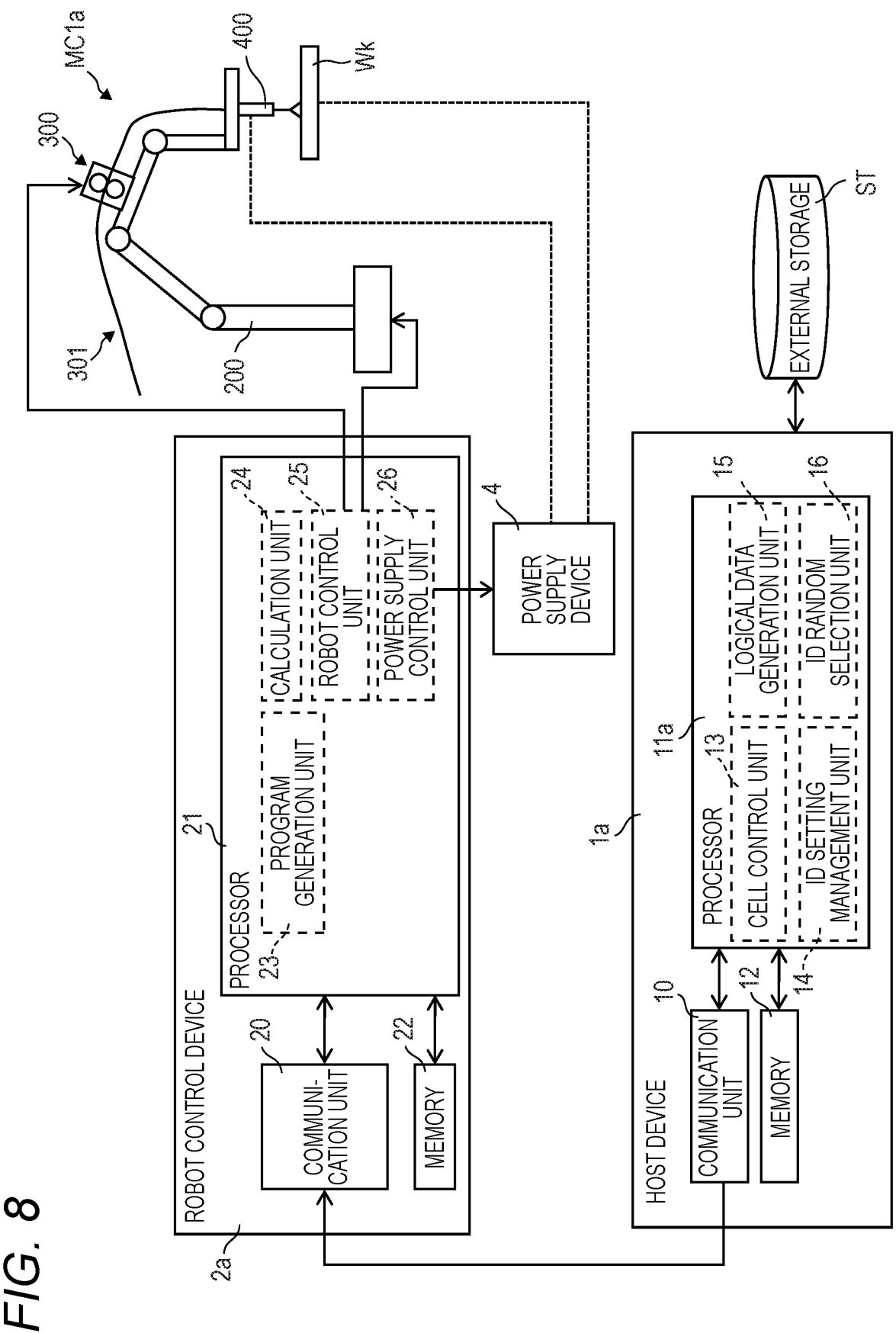
FIG. 8 is a diagram showing an internal configuration example of a robot control device and a host device according to a second embodiment.

Next, an operation procedure of the ID management by the welding system 100 according to the first embodiment will be described with reference to FIG. 7. FIG. 7 is a sequence diagram showing an operation procedure example of the ID management in the welding system 100 according to the first embodiment. In the description of FIG. 7, an operation procedure performed between the host device 1 and the robot control device 2a in the welding process using the original workpieces W1 and W2 shown in FIG. 3 will be described as an example.

In FIG. 7, the host device 1 acquires workpiece information (for example, the ID, the name, and the welding portion of the original workpiece) including the IDs of the original workpieces W1 and W2 which are targets of the welding process (main welding) (St1), and generates a welding process execution command including the workpiece information on the original workpieces W1 and W2. The host device 1 sends the welding process execution command including the workpiece information on the original workpiece W1 and the workpiece information on the original workpiece W2 to the robot control device 2 (St2).

When the robot control device 2a receives the welding process execution command sent from the host device 1, the robot control device 2a generates a welding process program to be executed by the main welding robot MC1a using the workpiece information on each of the plurality of original workpieces W1 and W2 included in the execution command, and causes the main welding robot MC1a to execute the main welding according to the program (St3). The robot control device 2a determines the completion of the main welding (welding process) by the main welding robot MC1a by various known methods (St4), generates a main welding completion notification indicating that the main welding of each of the original workpieces W1 and W2 is individually completed, and sends the main welding completion notification to the host device 1 (St5).

After the main welding is completed, the robot control device 2a randomly selects which ID of the original workpieces W1 and W2 is to be adopted as the ID of the secondary workpiece W3 based on the ID strength of the original workpieces W1 and W2 (St6). For example, it is assumed that the ID "A" of the original workpiece W1 is selected. The robot control device 2a sends the secondary workpiece information (for example, the workpiece information (for example, the ID of the original workpiece, the name, and the welding portion of the original workpiece) including the ID "A" of the secondary workpiece W3, the ID of each of the plurality of original workpieces W1 and W2 used in the welding process and the welding condition at the time of execution of the welding process) including the ID of the secondary workpiece W3 selected in step St6 to the host device 1 (St7).

When the host device 1 receives the secondary workpiece information including the ID of the secondary workpiece W3 transmitted from the robot control device 2a, the host device 1 sets the ID "A" selected by the robot control device 2a as the ID "A" of the secondary workpiece W3, and generates the welding process logical data (see FIGS. 3 and 4) related to the secondary workpiece W3 (St8). The host device 1 sets the management ID corresponding to the ID "A" of the secondary workpiece W3, and stores the management ID and the welding process logical data related to the secondary workpiece W3 in association with each other in the external storage ST (St9). In step St9, the data stored in the external storage ST may be data in which the randomly selected ID is associated with the welding process logical data related to the secondary workpiece W3.

As described above, in the welding system 100 according to the first embodiment, the host device 1 acquires information on the ID of each of the plurality of original workpieces W1 and W2 used in the welding process. The robot control device 2a randomly selects which of the IDs of the plurality of original workpieces W1 and W2 is to be adopted based on completion of execution of the welding process using the plurality of original workpieces W1 and W2 by the main welding robot MC1a (a part of the welding system 100). The host device 1 sets the ID of any of the original workpieces selected by the robot control device 2a as the ID of the welded workpiece (for example, the secondary workpiece) generated by the welding process.

Accordingly, the welding system 100 according to the first embodiment can support efficient and easier management of the IDs of workpieces (in other words, welded workpieces) manufactured in the welding process in which the plurality of original workpieces are joined or the like. That is, as in JP-A-2017-102548 in the related art, a new ID is not set every time one workpiece is located in a different manufacturing machine (in other words, the main welding robot), and the ID of the manufactured welded workpiece is a randomly-selected one of the IDs of the plurality of original workpieces used in the welding process, so that the management of the ID by the user is simplified without increasing the ID uselessly.

The ID includes a combination of a plurality of character codes (for example, "AAA001"). Accordingly, the welding system 100 can easily manage the ID of the welded workpiece (for example, the secondary workpiece) by combining a serial number and the character code indicating the type of the company or the customer, for example, in accordance with a business form of the user business operator (for example, a business test).

The character code includes, for example, alphabets and numbers. Accordingly, in view of the fact that the ID is often constituted by a combination of the alphabet and the numeral, the management of the ID of the welded workpiece can be simplified and universally used.

The host device 1 generates and stores data (for example, welding process logical data) indicating a relationship between the ID of the welded workpiece (for example, the secondary workpiece) and the ID of each of the plurality of original workpieces used in the welding process. Accordingly, even after the welding process is completed, the user can comprehensively grasp the data on the original workpieces used for manufacturing the secondary workpiece without losing the information on the original workpiece having an ID that has not been selected.

The data (for example, the welding process logical data) indicates the temporal order of each of the plurality of welding processes when the welding process includes the plurality of welding processes (see FIG. 4). Accordingly, the user can intuitively grasp, from the ID of the secondary workpiece, which original workpiece having which ID is used and which welding process is performed in which time series order the secondary workpiece is manufactured.

The data (for example, the welding process logical data) includes welding conditions of the welding process. Accordingly, the user can intuitively grasp what welding condition the welding process is executed.

The welding system 100 holds, in the external storage ST, the management table (for example, the correspondence table XTB1) in which the ID of any of the selected original workpieces is associated with a management identifier (for example, the management ID) managed by the user (for example, the user business operator). Accordingly, in the welding system 100, since the user business operator can set the management ID suitable for the character code (for example, the alphabet) unique to the company or the customer (for example, the shipping destination), the ID of the welded workpiece can be appropriately managed in accordance with actual circumstances of management of the user business operator.

The robot control device (for example, the robot control device 2a) constituting the welding system 100 includes a memory 22 that holds information on the ID of each of the plurality of original workpieces, a processor 21 that controls the main welding robot (for example, the main welding robot MC1a) so as to be able to execute the welding process using the plurality of original workpieces, and a communication unit 20 that communicates with the host device 1 that integrally controls the welding system 100. Based on the completion of the execution of the welding process by the main welding robot, the processor 21 randomly selects which of the IDs of the plurality of original workpieces is to be adopted. The processor 21 transmits a setting request in which the ID of any of the selected original workpieces is set as the ID of the welded workpiece generated by the welding process to the host device 1 via the communication unit 20.

Accordingly, the robot control device (for example, the robot control device 2a) according to the first embodiment can support efficient and easy management of the IDs of workpieces (in other words, welded workpieces) manufactured in the welding process in which the plurality of original workpieces are joined or the like. That is, as in JP-A-2017-102548 in the related art, a new ID is not set every time one workpiece is located in a different manufacturing machine (in other words, the main welding robot), and the ID of the manufactured welded workpiece is a randomly-selected one of the IDs of the plurality of original workpieces used in the welding process by the robot control device (for example, the robot control device 2a) according to the first embodiment, so that the management of the ID by the user is simplified without increasing the ID uselessly.

Second Embodiment

In the first embodiment, the ID of the welded workpiece (for example, the secondary workpiece) generated in the welding process is selected by the robot control device (for example, the robot control device 2a). In the second embodiment, an example in which the selection is performed by the host device 1 will be described.
(Configuration of Welding System)

Figure 9:
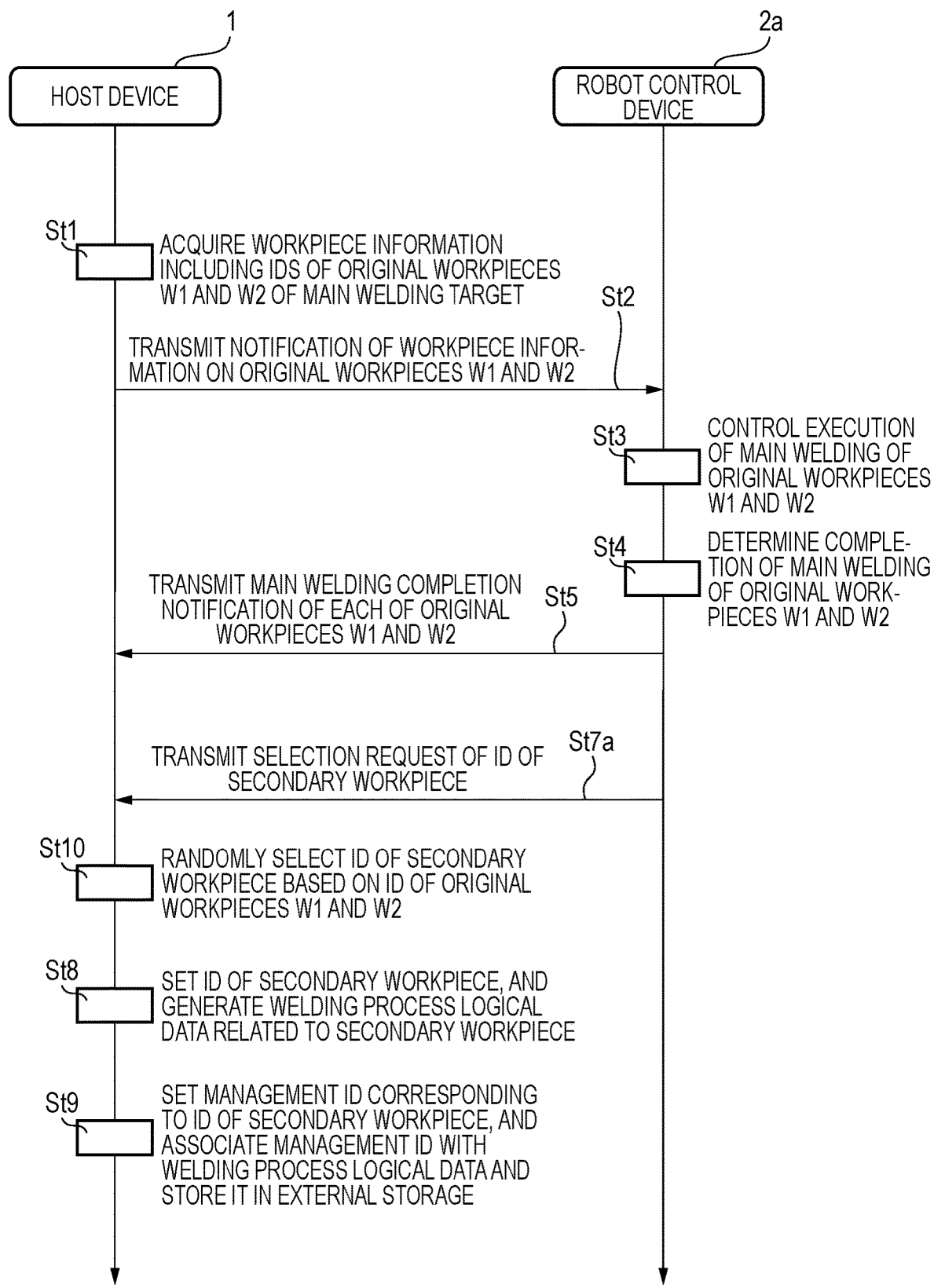
FIG. 9 is a sequence diagram showing an example of an operation procedure of ID management in a welding system according to the second embodiment.

FIG. 9 is a diagram showing an internal configuration example of the robot control device 2a and a host device 1a according to the second embodiment. In the description of FIG. 9, the same components as those shown in FIG. 2 are denoted by the same reference numerals, description thereof will be simplified or omitted, and different contents will be described.

The host device 1a generates a welding process execution command using each of the plurality of original workpieces by using the welding-related information input or set in advance by the user, and transmits the execution command to the robot control device 2a. The host device 1a includes at least the communication unit 10, a processor 11a, and the memory 12.

The processor 11a is configured with, for example, a CPU or an FPGA, and executes various processing and controls in cooperation with the memory 12. Specifically, the processor 11a functionally implements a cell control unit 13, an ID setting management unit 14, a logical data generation unit 15, and an ID random selection unit 16 by referring to a program held in the memory 12 and executing the program. In other words, in the second embodiment, the ID random selection unit 27 included in the processor 21 of the robot control devices 2a, 2b, and so on according to the first embodiment is included in the processor 11a of the host device 1a.

After the welding process using the plurality of original workpieces is completed by the main welding robot (for example, the main welding robot MC1a), the ID random selection unit 16 randomly selects and determines which ID among the IDs of the plurality of original workpieces is to be adopted as the ID of the welded workpiece (secondary workpiece) using the data transmitted from the robot control device (for example, the robot control device 2a).
(Operation of Welding System)

Next, an operation procedure of the ID management by the welding system 100 according to the second embodiment will be described with reference to FIG. 9. FIG. 9 is a sequence diagram showing an example of an operation procedure of the ID management in the welding system 100 according to the second embodiment. In the description of FIG. 9, an operation procedure performed between the host device 1 and the robot control device 2a in the welding process using the original workpieces W1 and W2 shown in FIG. 3 will be described as an example, and the same processing as those in FIG. 7 are denoted by the same step numbers, the description thereof will be simplified or omitted, and different contents will be described.

In FIG. 9, after transmitting the main welding completion notification corresponding to each of the original workpieces W1 and W2 in step St5 to the host device 1a, the robot control device 2a transmits the secondary workpiece information (for example, workpiece information (for example, an ID and a name of the original workpiece, a welding portion of the original workpiece) including an ID of each of the plurality of original workpieces W1 and W2 used in the welding process, and a welding condition at the time of execution of the welding process) to the host device 1 (St7a).

When the host device 1a receives the secondary workpiece information (see the above description) transmitted from the robot control device 2a in step St7a, the host device 1a randomly selects which ID of the original workpieces W1 and W2 is to be adopted as the ID of the secondary workpiece W3 (St10). For example, it is assumed that the ID "A" of the original workpiece W1 is selected.

The host device 1a sets the ID "A" selected in step St10 as the ID "A" of the secondary workpiece W3, and generates the welding process logical data (see FIGS. 3 and 4) related to the secondary workpiece W3 (St8). The host device 1a sets a management ID corresponding to the ID "A" of the secondary workpiece W3 and stores the management ID and the welding process logical data related to the secondary workpiece W3 in association with each other in the external storage ST (St9).

As described above, in the welding system 100 according to the second embodiment, the host device 1a constituting the welding system 100 includes the memory 12 that holds information on the ID of each of the plurality of original workpieces, the communication unit 10 that communicates with the robot control device 2a that controls the execution of the welding process using the plurality of original workpieces, and the processor 11 that randomly selects which of the IDs of the plurality of original workpieces is to be adopted according to the predetermined rule based on detection of the completion of the execution of the welding process by the robot control device 2a. The processor 11 sets the ID of any of the selected original workpieces as the ID of the welded workpiece generated by the welding process.

Accordingly, the host device 1a according to the second embodiment can support efficient and easy management of the IDs of workpieces (in other words, welded workpieces) manufactured in the welding process in which the plurality of original workpieces are joined or the like. That is, as in JP-A-2017-102548 in the related art, a new ID is not set every time one workpiece is located in a different manufacturing machine (in other words, the main welding robot), and the ID of the manufactured welded workpiece is a randomly-selected one of the IDs of the plurality of original workpieces used in the welding process by the host device 1a according to the second embodiment, so that the management of the ID by the user is simplified without increasing the ID uselessly.

Although the various embodiments are described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that such changes also belong to the technical scope of the present disclosure. Further, components in the various embodiments described above may be combined optionally in the range without deviating from the spirit of the invention.

The present application is based on Japanese Patent Application (Japanese Patent Application No. 2019-188158) filed on Oct. 11, 2019, and contents thereof are incorporated herein by reference.

The present disclosure is useful as an identifier management method, a robot control device, and an integrated control device, which support efficient and easy management of an identifier of a workpiece manufactured in a process such as welding.

The invention claimed is:

1. An identifier management method to be executed by a welding system, the identifier management method comprising:
   receiving a welding process command to weld a plurality of original workpieces to generate a welded workpiece;
   acquiring information on identifiers of the plurality of original workpieces;
   randomly selecting one of the identifiers of the plurality of original workpieces; and
   in response to the welding process command, causing a welding robot to weld the plurality of original workpieces to generate the welded workpiece and assigning the randomly selected one of the identifiers as an identifier of the welded workpiece.

2. The identifier management method according to claim 1,
   wherein each of the identifiers comprises a combination of a plurality of character codes.

3. The identifier management method according to claim 2,
   wherein the character codes comprise an alphabet and a number.

4. The identifier management method according to claim 1, further comprising:
   generating and storing data indicating a relationship between the identifier of the welded workpiece and the identifiers of the respective original workpieces.

5. The identifier management method according to claim 4,
   wherein in a case in which the welding of the plurality of original workpieces includes a plurality of welding processes, the data indicates a temporal order of the plurality of welding processes.

6. The identifier management method according to claim 4,
   wherein the data comprises a welding condition of the welding of the plurality of original workpieces.

7. The identifier management method according to claim 1, further comprising:
   holding a management table in which the randomly selected one of the identifiers is in association with a management identifier.

8. A robot control device constituting a welding system, the robot control device comprising:
   a memory configured to hold information on identifiers of a plurality of original workpieces;
   a processor configured to receive a welding process command to weld the plurality of original workpieces to generate a welded workpiece, and to randomly select one of the identifiers; and
   a communication unit configured to communicate with an integrated control device that performs integrated control of the welding system, wherein, in response to the welding process command, the processor is further configured to:
cause a welding robot to weld the plurality of original workpieces to generate the welded workpiece; and
assign the randomly selected one of the identifiers as an identifier of the welded workpiece.

9. An integrated control device constituting a welding system, the integrated control device comprising:
a memory configured to hold information on identifiers of a plurality of original workpieces;
a communication unit configured to communicate with a robot control device configured to control execution of a welding process using the plurality of original workpieces to generate a welded workpiece; and
a processor configured to
issue a welding process command to the robot control device to weld the plurality of original workpieces to generate the welded workpiece, randomly select one of the identifiers of the plurality of original workpieces, in response to the welding process command, cause a welding robot, via the robot control device, to weld the plurality of original workpieces to generate the welded workpiece, and, in response to a welding completion notification from the robot control device,
assign, as an identifier of the welded workpiece, the randomly selected one of the identifiers.

* * * * *